(12) United States Patent
Guthrie et al.

(10) Patent No.: US 7,533,227 B2
(45) Date of Patent: *May 12, 2009

(54) METHOD FOR PRIORITY SCHEDULING AND PRIORITY DISPATCHING OF STORE CONDITIONAL OPERATIONS IN A STORE QUEUE

(75) Inventors: Guy Lynn Guthrie, Austin, TX (US); Hugh Shen, Austin, TX (US); Derek Edward Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/033,441

(22) Filed: Feb. 19, 2008

(65) Prior Publication Data
US 2008/0140936 A1    Jun. 12, 2008

Related U.S. Application Data

(63) Continuation of application No. 10/970,437, filed on Oct. 21, 2004, now Pat. No. 7,360,041.

(51) Int. Cl.
*G06F 12/00*    (2006.01)

(52) U.S. Cl. .......... 711/158; 711/117; 711/118; 711/128; 711/151

(58) Field of Classification Search .......... 711/158, 711/117–118, 151
See application file for complete search history.

(56) References Cited

U.S. PATENT DOCUMENTS

| 5,333,319 | A  | * | 7/1994  | Silen ............ 718/103 |
| 6,665,699 | B1 | * | 12/2003 | Hunter et al. ...... 718/102 |
| 7,360,041 | B2 | * | 4/2008  | Guthrie et al. ..... 711/158 |

* cited by examiner

*Primary Examiner*—Tuan V Thai
*Assistant Examiner*—Zhuo H Li
(74) *Attorney, Agent, or Firm*—Dillon & Yudell LLP

(57) ABSTRACT

A method, system, and processor chip design for reducing the latency between completing a LARX operation and receiving the associated STCX operation to complete the update to the cache line. Each entry of the store queue of the issuing processor is provided an additional tracking bit (priority bit). The priority bit is set whenever a STCX operation is placed within the entry. During selection of an entry for dispatch by the arbitration logic, the arbitration logic scans the value of the priority bits of each eligible entry. An entry with the priority bit set is given priority in the selection process within architectural rules. That entry is then selected for dispatch as early as is possible within the established rules.

5 Claims, 8 Drawing Sheets

METHOD FOR PRIORITY SCHEDULING AND PRIORITY DISPATCHING OF STORE CONDITIONAL OPERATIONS IN A STORE QUEUE

PRIORITY CLAIM

The present application is a continuation of U.S. patent application Ser. No. 10/970,437, filed on Oct. 21, 2004 now U.S. Pat. No. 7,360,041 and entitled, "Method for Priority Scheduling and Priority Dispatching of Store Conditional Operations in a Store Queue," the contents of which is incorporated herein by reference.

BACKGROUND OF THE INVENTION

1. Technical Field

The present invention relates generally to data processing systems and specifically to processor-to-cache updates within data processing systems. Still more particularly, the present invention relates to scheduling dispatch of store conditional operations utilized to complete processor-to-cache updates.

2. Description of the Related Art

Increasing efficiency of data operations at the processor-cache level is an important aspect of processor chip development. Modern microprocessors typically contain entire storage hierarchies (caches) integrated onto a single integrated circuit. For example, one or more processor cores containing level 1 (L1) instruction and/or data caches are often combined with an on-chip L2 cache. The L1 cache is typically a store-through cache and the L2 cache provides a coherent view of the memory hierarchy.

In a multiprocessor computer system (MP), the individual processors often need to write to certain shared memory locations of the MP in a synchronized fashion. Traditionally, this synchronization has been achieved by the processor altering the memory location utilizing an atomic "read-modify-write" operation. These operations read, modify, and then write the specific memory location in an atomic fashion. Examples of such operations are the well known "compare-and-swap" operation and the "test-and-set" operation.

In more recent MP systems, it has become difficult to ensure atomicity within a single operation. Therefore, in some conventional processors, atomicity is instead effected using a pair of instructions, referred to herein as LOAD_LOCKED (LARX) and STORE_CONDITIONAL (STCX) instructions. These instructions are used in sequence.

LARX and STCX instructions, while not atomic primitives in themselves, effect an atomic read-modify-write of memory by monitoring for any possible changes to the location in question between the LARX and STCX instructions. In effect, the STCX operation only succeeds when the LARX and STCX instructions execution produces an atomic read-modify-write update of memory. Those skilled in the art are familiar with the processing of LARX and STCX operations to affect atomic updates of memory. The following thus provides only a brief overview of the process.

The processing of a LARX/STCX instruction pair begins with the thread of execution issuing a LARX instruction. A LARX instruction is a special form of a load instruction that returns load data for the location requested and further instructs the memory coherence mechanism in the MP to monitor for writes that could potentially alter the read memory locations. In particular, the memory coherence mechanism will typically monitor for any write operations to the cache line containing the memory location or locations returned by the LARX instruction. The monitored region of memory is referred to as the "reservation granule" and typically, but not always corresponds to the size of a cache line. Furthermore, a LARX instruction also ensures that the data loaded is not stale (i.e., the value loaded is the most recent globally visible value for the location). If the value is stale, the subsequent STCX instruction will fail.

Once data is returned from a LARX instruction, the thread of execution typically, but not always, modifies the returned data within the registers of the processor core utilizing some sequence of arithmetic, test, and branch instructions corresponding to the particular type of atomic update desired (e.g. fetch-and-increment, fetch-and-decrement, compare-and-swap, etc.).

Next, the thread of execution typically issues a STCX instruction to attempt to store the modified value to the location in question. The STCX instruction will succeed only if (1) the coherence mechanism has not detected any write operations to the reservation granule between the LARX operation and the STCX operation and (2) the LARX operation initially returned a non-stale value for the location. If both of these conditions are met, the STCX instruction updates memory and a signal/message is returned to the processor core indicating the STCX was successful. If the STCX is not successful, a signal is returned to the processor core indicating the STCX failed and memory is not updated.

The thread of execution is usually stalled at the STCX instruction until the "pass" or "fail" indication for the STCX instruction is returned. Even in those cores that can execute instructions beyond a STCX that is waiting for its pass or fail indication, it is usually not possible to execute another LARX and STCX sequence because the coherence mechanism usually cannot easily provide tracking for more than one address per thread of execution at a time. Finally, the thread of execution typically examines the pass (or fail) indication for the STCX instruction and repeats the sequence of steps if the STCX operation failed.

In typical software processing, which includes processing LARX and STCX operations, the STCX is issued from the processor core and processed similarly to other regular store operations. To increase processing efficiency of store operations, conventional processor chips are often designed with a "store queue" that is typically placed between a processor core and the L2 cache and is used to process regular store operations as well as STCX operations. A store queue typically contains byte-addressable storage for a number of cache lines (usually 8 to 16 cache lines).

Store operations originate at the processor core and are temporarily held in an entry of the store queue. The store operations target a particular cache line (or portion of the cache line) identified by the address within the store operation, and the store operation also provides data to be stored within the addressed portion of that cache line (e.g., byte 12).

The store operations update particular bytes within the cache line entry in the store queue. Concurrent with these data updates, corresponding bits within byte enable register in the store queue are set to track which bytes within the cache line entry have been updated by store operations. Typically, a series of store operations writing to a same entry in the store queue are absorbed by the store queue entry before the line is dispatched to the L2 cache. This absorption of multiple store operations into a single entry is referred to as "gathering" stores, since multiple different stores addressing the same cache line are "gathered" into an entry of the store queue before the line is presented to the L2 cache for storage.

Unlike the normal store operation, however, a STCX is allocated to its own entry, and is one of several operations that are not allowed to gather within an entry. Due to the conditional nature of a STCX, it is impractical to enter the STCX data into an entry in the store queue with other non-STCX operations. Doing so would require significant additional bookkeeping resources to identify those bytes within the store queue entry that have potentially been altered by a STCX and the values these bytes should revert to in the event the STCX operation failed.

FIG. 2 illustrates a prior art representation of specific hardware and logic components of a processor chip that are utilized to complete data store operations. As illustrated, processor chip 201 includes a processor core 203, store queue 207 with store queue (STQ) controller 205, and read claim (RC) dispatch logic 219. STQ controller 205 includes arbitration logic 206 utilized for selecting entries from the store queue 207, as described below. RC dispatch logic 219 supports a series of RC machines 221, which complete the actual data store operations at the lower-level cache (not shown).

The store queue 207 provides several rows (entries) for temporarily storing and tracking processor-issued stores. Each row is divided into several columns that provide byte enable register 209, address register 211, data register 213, controls bits 215, and valid bit 217. Data register 213 and address register 211 store data issued from the processor core 203 and the corresponding data (memory) address, respectively. Processor-issued data updates (i.e., store operations) typically target only a small portion (i.e., 1-byte to 16-bytes) of a cache line compared to the entire cache line (typically 128-bytes). For example, it is possible for a processor-issued store operation to target only a single byte granule of a 128-Byte cache line to update, and cache line updates are completed via a combination of these individual store operations, which may occur sequentially. Byte enable register 209 includes a number of bookkeeping bits. Conventionally the number of bits corresponds to the number of individually addressable storage granules within a cache line. Thus, for example, for a 128-byte cache line entry and byte store operations, byte enable register 209 maintains 128 bits for tracking single-byte processor-issued stores. This enables tracking of specific bytes (or group of bytes) within a 128-byte cache line entry that is being updated by the processor.

The store queue arbitration logic 206 in the store queue controller 205 looks at all the available entries in the queue and determines which entries are eligible to be processed by the RC mechanism 225 based on a set of architectural rules. For instance, a younger store to the same address as an older store cannot be processed before the older store. Neither can stores bypass barrier operations. The arbitration logic 206 then selects one of the eligible stores to request to the RC mechanism 225 for further processing. The selection process is typically a round robin scheme that takes no account as to the age of the eligible store operations. If the RC mechanism 225 accepts the request, the store queue entry closes down its ability to gather and is removed from the queue. If the RC mechanism 225 rejects the request, the arbitration logic 206 then selects another eligible store, if one is available, or tries again with the same entry if there are no others.

Valid bit 217 indicates to STQ controller 205 when data within a particular row of the store queue 207 is valid, and valid bit 217 is checked before arbitration logic 206 selects a row of data (or an entry) to forward to RC Dispatch logic 219. Once a valid bit is set, arbitration logic 206 is able to select the entry regardless of whether additional stores to that cache line are being sent by the processor core and as long as the architectural rules for processing stores are observed. Control Bits 215 represents an assortment of additional bits that are utilized by STQ controller 205. The functionality of several of the above-described columns is referenced within the description of the data store operations below.

In the store queue described above, a STCX is given no consideration over any other store and must wait its turn to be selected for dispatch by STQ controller 205. Consequently, a processor core can be made to wait longer for a pass or fail indication for the STCX if there are other operations in the store queue.

FIG. 3A provides a flow chart illustrating the overall processing of a LARX/STCX instruction sequence. The process begins at step 341 and proceeds to step 343 at which the LARX operation is issued to read the desired location and inform the coherence mechanism to monitor for any writes to the reservation granule containing the desired location. Following, the STCX operation is issued to the store queue at step 345, and the STCX is allocated an entry within the store queue and the entry is marked valid for selection as shown at step 347. After the entry containing the STCX becomes eligible for dispatch based on architectural rules, the entry is eventually selected for dispatch by the arbitration logic as shown at step 349. The STCX is then dispatched to attempt to update the desired location at step 351. At step 353, a determination is made by the dispatch mechanism whether the STCX was successful. If the STCX was successful, then the cache line is updated with the data from the STCX operation and the processor is signaled of the success at step 355. However, if the STCX was unsuccessful (i.e., failed), the processor is signaled of the failure of the operation at step 357, and the processor responds accordingly. The process then ends at step 359.

FIG. 3B illustrates a process by which a STCX operation issued by a processor is assigned to an entry within the store queue. The process begins at step 301 and proceeds to step 303 at which a determination is made whether there is an available entry within the store queue to assign a next store operation. When all entries of the store queue have been assigned (i.e., there is no available entry to assign to a new store operation and no gatherable entry exists for that store operation), the processor core suspends issuance of new store operations to the queue until an entry becomes available, as indicated at step 305.

In conventional systems, a tracking mechanism is provided within the core and/or the store queue to track when there are available entries to assign to store operations being issued by the core. The core is thus able to suspend issuance of store operations when those operations cannot be buffered within the store queue.

Typically, an entry becomes available when the contents of that entry are dispatched to an RC machine. That is, an entry becomes available when an older cache line entry is removed from the store queue and sent to the L2 cache for storage therein. A variety of different policies (some described below) may be utilized to determine when cache lines are moved from the store queue to be stored in the L2 cache. One important consideration in this process is the status of the valid bit associated with the entry. An entry can only be selected if the valid bit associated with the entry is set.

Returning to decision step 303, when there is an available entry, the processor core issues the STCX operation to the store queue as shown at step 304. The STCX operation is received at the store queue, and an available (un-allocated) entry is allocated to the STCX operation, as shown at step 307. Then the entry's valid bit 217 is set at step 311 to signal ready for dispatch to arbitration logic 206. The process then ends at step 313.

When a cache line entry is removed from the store queue to be sent to the L2 cache, the cache line entry is assigned by RC dispatch logic 219 to RC state machine 221, which updates the cache line of the L2 cache with the data from within entry 207. Thus, for every RC machine 221 assigned to a store operation, the entire cache line must be read and manipulated regardless of how many bytes of the cache line are actually being updated.

FIG. 3C provides a flow chart of the processes involved in selecting an entry of the store queue to forward to the lower level cache. The process begins at step 321 and proceeds to step 323, at which the STQ controller scans the valid bits of each entry to see which entries are eligible for dispatch. A determination is made at step 325 whether there are valid entries eligible for selection by the arbitration logic. When there are valid entries (i.e., entries with their valid bit 217 set to logic high and are architecturally ready), the arbitration logic selects one entry for dispatch from among all eligible entries and forwards the selected entry to RC mechanism, as shown at step 327. The process then continues for other entries.

In determining which entry to select for dispatch, the arbitration logic looks at all the valid entries in the queue and determines, based on a set of architectural rules, which entries are eligible to be processed by the RC machine. The arbitration logic selects one of the eligible entries and signals the RC dispatch logic of the availability of that entry for dispatch to an RC machine. Conventional selection processes are typically via a round robin scheme amongst eligible entries. With this conventional approach, an entry that holds a newly issued STCX operation is given no higher priority than any other store within the store queue that is concurrently available for selection based on the architectural rules.

The above-described method of updating a cache line within the L2 cache with STCX operations yields a number of inefficiencies, particularly when other processes are arbitrating for write access to the same cache line. Frequently, as is known in the art, the reserved granule is updated by some other participant (processor, etc.) before the STCX operation completes its update to the line. Because of the latency involved in passing the STCX through the store queue mechanism, and the tendency for other processors to seek to update the same cache line, it is not uncommon for a STCX to fail. When this occurs, the processor is forced to reissue the operation pair (beginning with the LARX) and this requires extra use of processor resources and a measurable increase in latency when completing the update to the target cache line. In general, when processing LARX/STCX pairs it is desirable to minimize the window between the LARX and STCX operations as much as possible in order to help ensure no other writes to the reservation granule occur that would prevent the STCX operation from completing successfully.

The present invention recognizes the need for more efficient implementation of the LARX-STCX operations to reduce the occurrence of failed STCX operations and associated drain on processor resources. A method and system that reduces the latency between the completion of the LARX and the arrival at the cache of the STCX operation to update the cache line would be a welcomed improvement. These and other benefits are provided by the invention described herein.

SUMMARY OF THE INVENTION

Disclosed is a method and processor system for reducing the latency between completing a LARX operation and issuing the associated STCX operation from the store queue (STQ) to complete the update to the cache line. STCX operations are given higher priority than regular stores to be sent an RC machine. Each entry of the store queue of the issuing processor is provided an additional tracking bit (priority bit). The priority bit is set whenever a STCX operation is placed within the entry. During selection of an entry for dispatch by the arbitration logic, the arbitration logic scans the value of the priority bit of each eligible entry. An entry with the priority bit set is given priority in the selection process within architectural rules. That entry is then selected for dispatch as early as is possible within the established rules.

Since an entry with a STCX operation has its priority bit set, that entry is tagged for dispatch ahead of entries with regular store operations whose priority bits are not set. This ensures the STCX arrives at the cache earlier than with conventional selection and dispatch methods. This effectively reduces the wait time of the STCX when other stores are in flight in front of the STCX.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

The present invention provides a method and processor-chip design/configuration by which the latency between completing a LARX operation and receiving the associated STCX operation at the cache to complete the update to the cache line is reduced. STCX operations within the store queue are given higher priority than regular store operations, and the higher priority results in early selection for dispatch by the arbitration logic. This effectively reduces the wait time of the STCX when other stores are in flight in front of the STCX.

The invention is implemented by providing an extension to the current bookkeeping logic associated with each entry of the store queue. New logic is added (or new functionality provided to existing logic) to keep track of the store queue entries that contain STCX operations. Once these entries are eligible for dispatch to the RC machine, they are given priority over any other eligible entry that contains a regular store operation. The store queue arbitration logic responds to the higher priority of the STCX entries by selecting the STCX entries for dispatch ahead of the other entries.

Thus, the arbitration logic is also enhanced to enable the selection of higher priority STCX operations over regular store operations. This enables the STCX to complete faster when other stores are waiting in the store queue.

Figure 1:
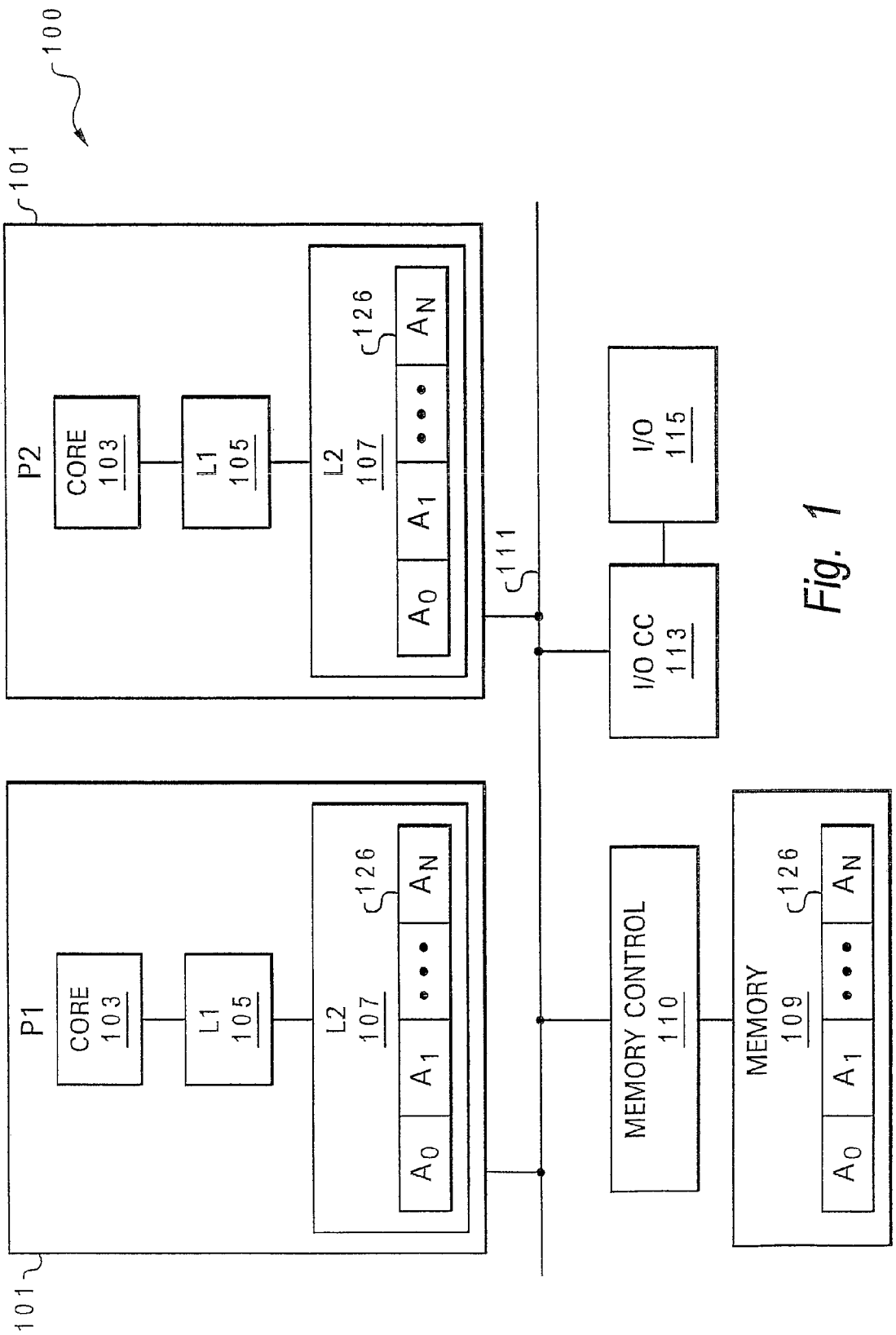
FIG. 1 is a block diagram illustrating a multiprocessor data processing system within which the various features of the invention may advantageously be completed.

With reference now the figures and in particular to FIG. 1, there is illustrated a multi-processor data processing system (MP) 100. MP 100 comprises several major components including processor chips 101, memory 109, and I/O device(s) 115. I/O device(s) have an associated I/O controller 113, while memory 109 has an associated memory controller 110 that controls access to and from memory 109.

Processor chips 101 are connected to memory 109 and I/O devices 115 via interconnect (system bus) 111 by which processor chips 101 communicate with each other and with memory 109, I/O devices 115, and other peripheral devices. Interconnect 111 may be a bifurcated bus with a data bus for routing data and a separate address bus for routing address transactions and other operations.

Processor chips 101 each contain processor core 103, an onboard L1 cache 105, and L2 cache 107. According to the present invention, L2 cache 107 supports intervention. Further, each cache is designed with a cache directory, an array of cache lines, and all data operations at each cache are completed according to a coherency protocol, such as a MESI coherency protocol.

The various features of the invention are carried out by logic components on processor chips 101 and affect store operations at the store queue and at specific cache lines within lower-level caches. For illustrative purposes, an exemplary cache line 126 is provided within L2 cache 107, and the invention is described from the perspective of updating a cache line (A) in the L2 cache 107 with store operations issued by a processor core and temporarily buffered in a store queue entry.

As illustrated within L2 cache 107 of FIG. 1, exemplary cache line A 126 may contain multiple blocks/granules of data, corresponding to individual bytes, words, double words, etc., each of which may be the target of an update by a processor-issued store operation. The specific size of each cache line 126 and number of updatable data blocks/granules may differ from system to system, and the exact parameters utilized within the invention are adjusted accordingly to provide the general functionality described herein. Also, while the present invention is described with specific reference to the L2 cache 107 within multi-level cache architecture, it is understood that the cache architecture need not be a multi-level one or the shown multi-level hierarchy.

The invention primarily describes conditional store operations (STCX) that update and/or modify a portion of a cache line. The processes carried out by the RC machines for the STCX operation are similar to those for normal store operations. These processes involve first checking that write access to the cache line is still available before the data can be written to the cache line. As is known in the art, certain conditions may affect whether the STCX operation succeeds or fails at the L2 cache 107. This part of the atomic process is not a focus of the invention and is not discussed in any additional detail. However, implementation of the invention substantially reduces the STCX failure conditions found in convention implementation.

The present invention is described with reference to MP 100 and component parts of MP 100 illustrated by FIG. 1 and FIG. 4 (described below), but the present invention may be applied to different configurations of data processing systems that are not necessarily conventional. As an example, the invention may be implemented within a non-uniform memory access (NUMA) system, wherein the system memory (RAM) is divided among two or more memory arrays (having separate memory controllers connected to the system bus) and allocated among the processing units. Also, MP 100 could include new hardware components not shown in FIG. 1, or have a novel interconnect architecture for existing components. MP 100 may also have a different number of processing units. Those skilled in the art will therefore appreciate that the present invention is not limited to the generalized system shown in FIG. 1.

Figure 4:
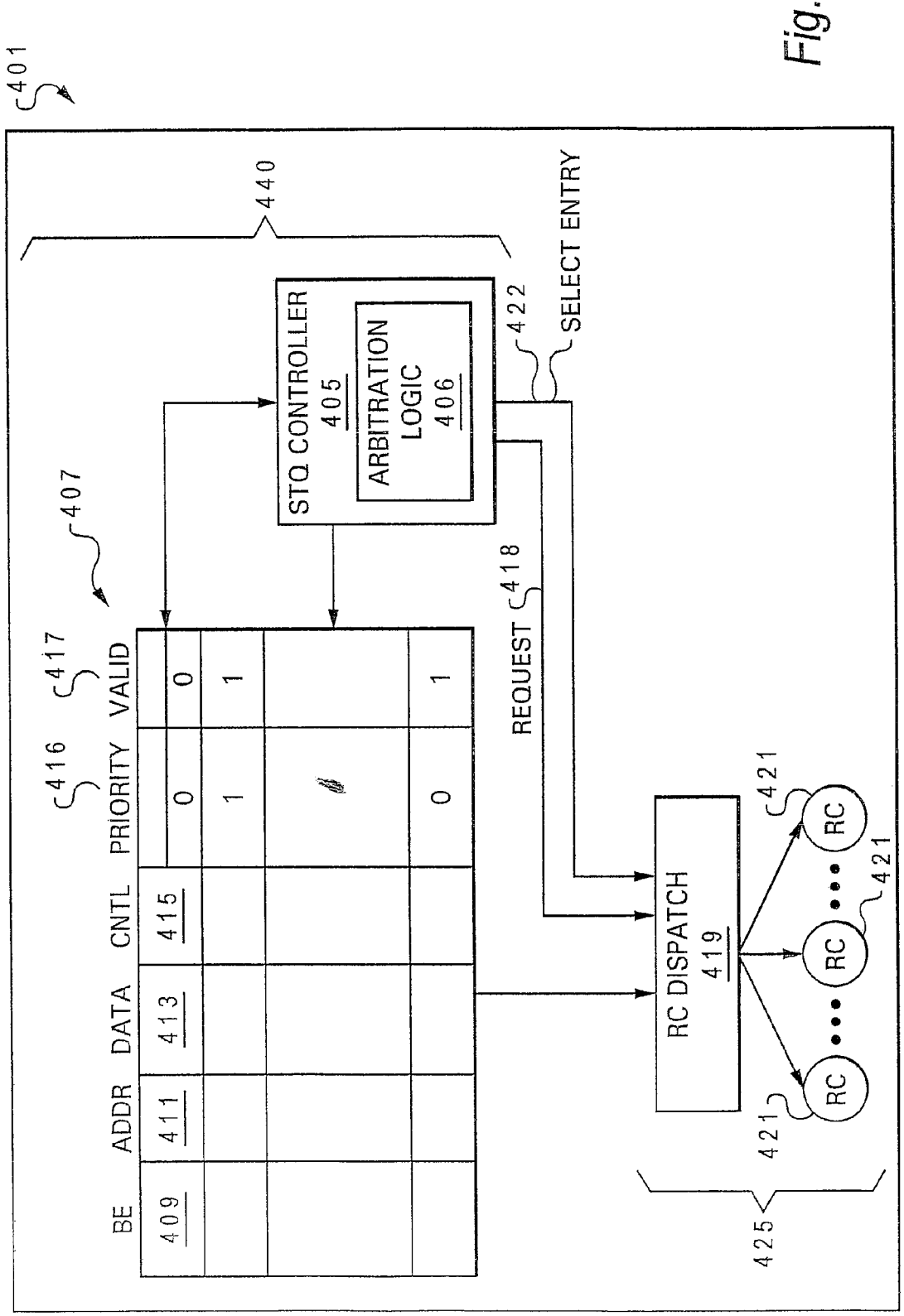
FIG. 4 is a block diagram of a store queue mechanism configured with a priority bit for each entry in accordance with one embodiment of the invention.

While the invention is practiced within the general data processing system 100 of FIG. 1, the particular implementation features of the invention are provided within the store queue and associated components of the processor chip, as exemplified by FIG. 4. Implementation of the invention requires certain enhancements to the store queue 407 and STQ controller 405.

Figure 2:
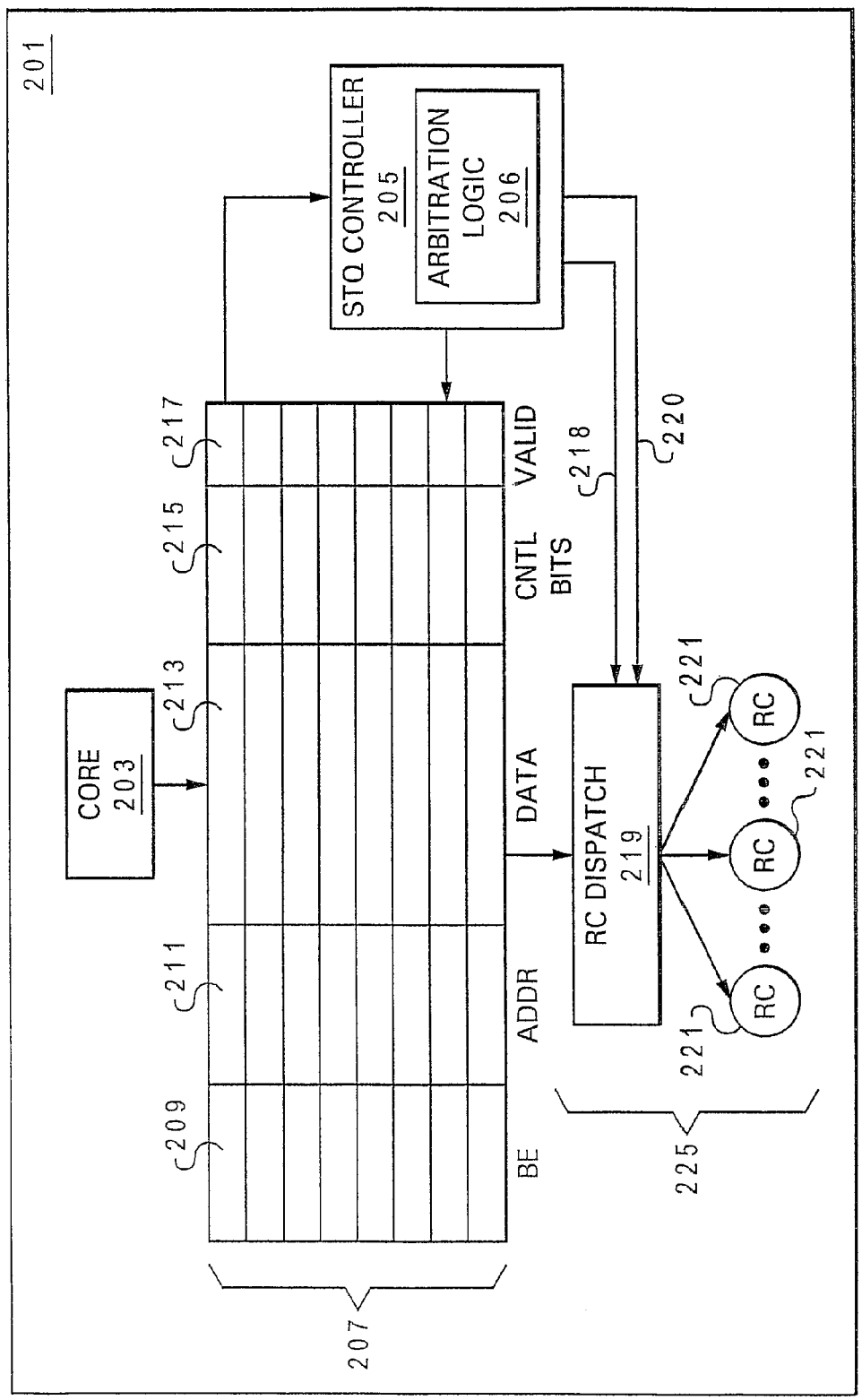
FIG. 2 is a prior art representation of processor components utilized to complete a store operation to a lower level cache.
Figure 3A:
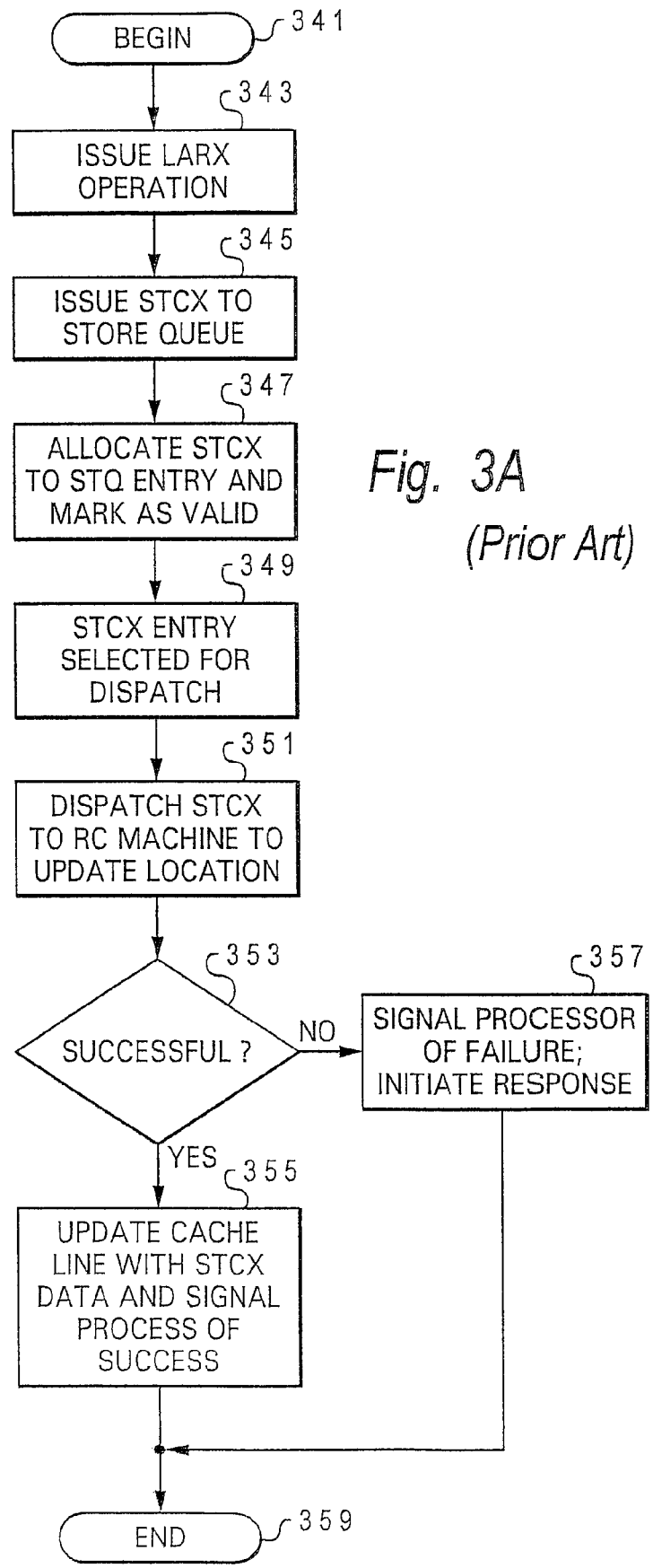
FIG. 3A is a flow chart illustrating the process of completing an atomic store utilizing a LARX-STCX pair of operations according to prior art.
Figure 3B:
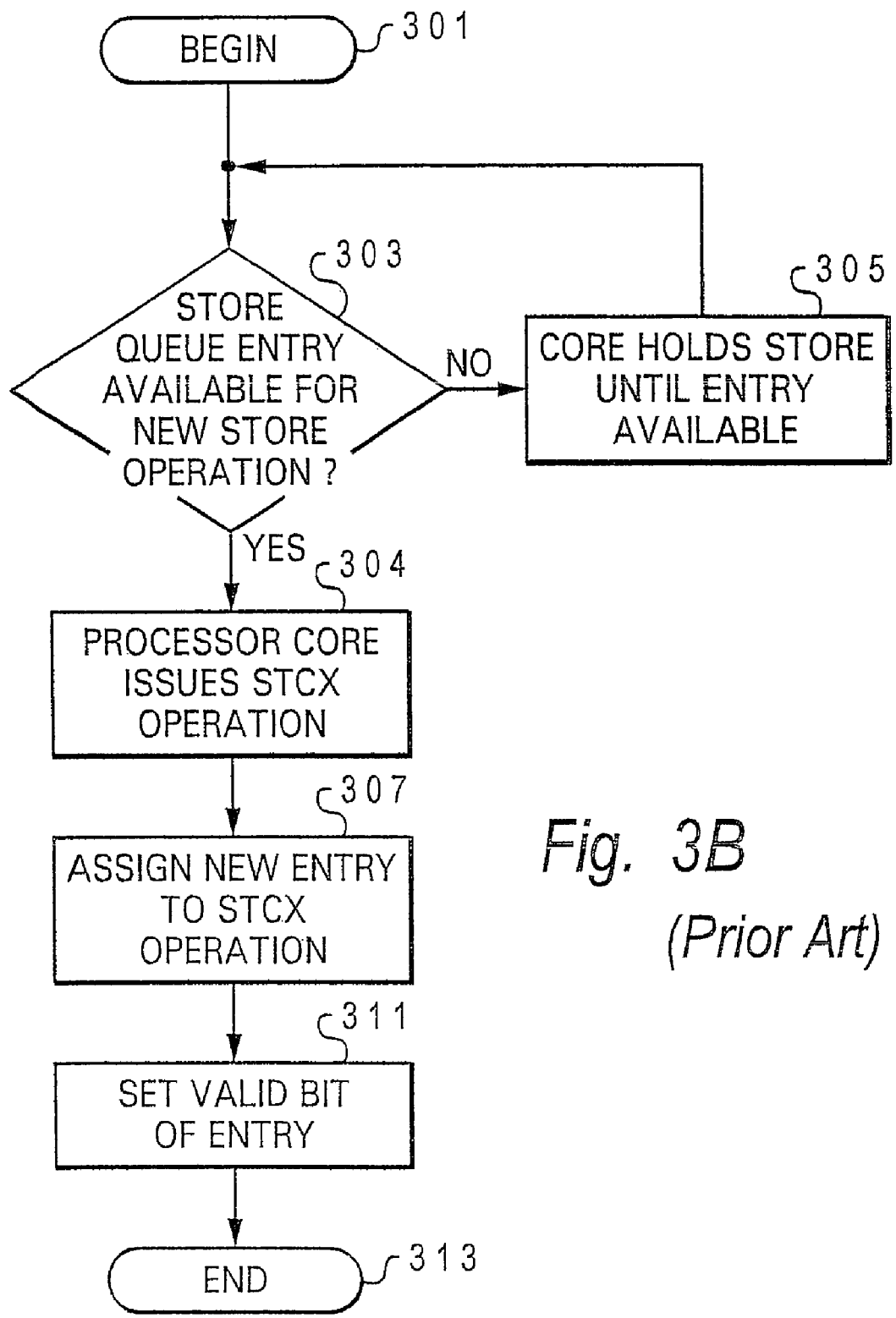
FIGS. 3B and 3C are flow charts illustrating the processes of storing a STCX within an entry of a store queue and selecting that entry from store queue according to prior art.
Figure 3C:
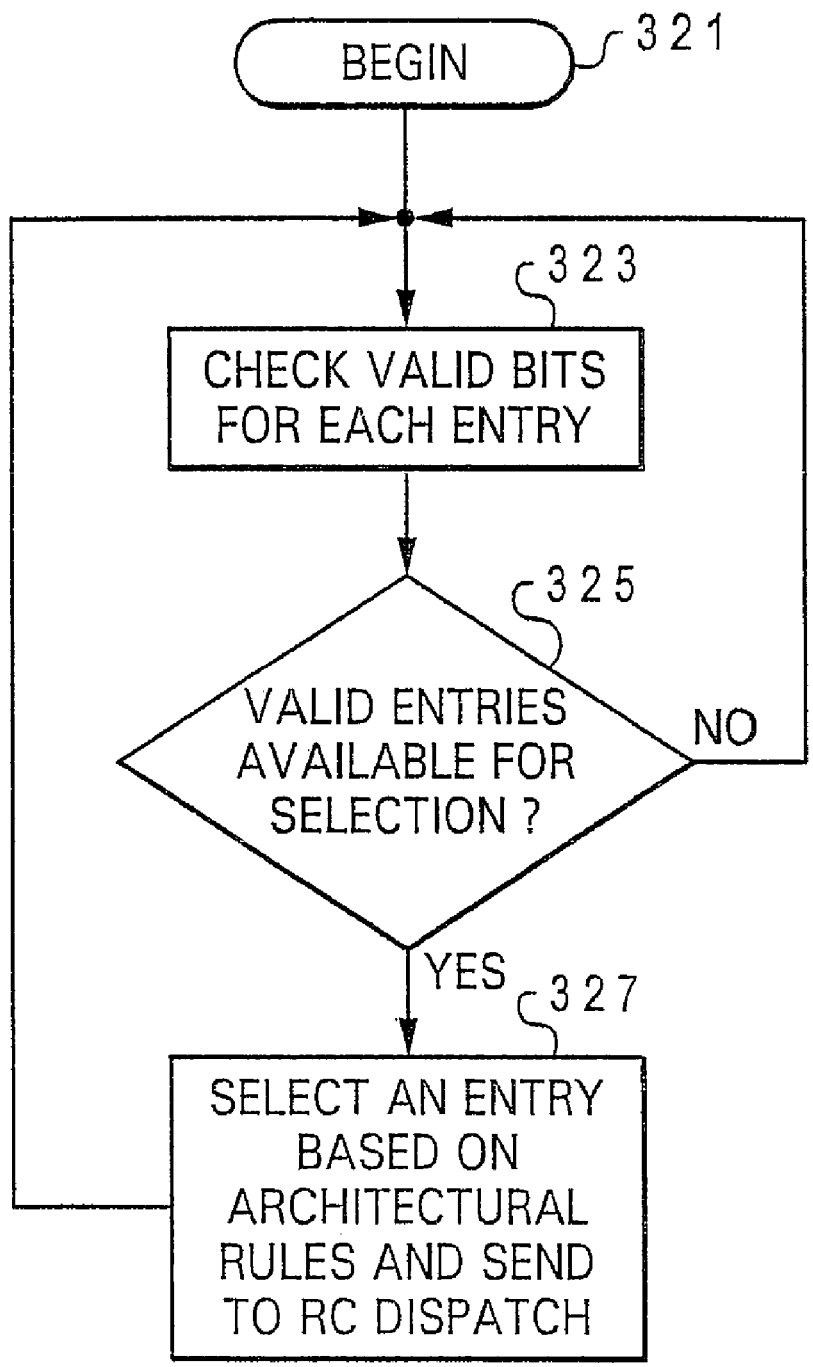

Unlike the configuration of FIG. 2, several enhancements are provided within the design of the store queue mechanism 440 of the processor chip 401, particularly the store queue 407 and arbitration logic 406 (and/or STQ controller 405). Among these enhancements are (1) an additional bit associated with each entry, which serves as priority bit 416 identifying an entry as a STCX operation; and (2) additional or enhanced logic within the arbitration logic 406 to (a) recognize the priority bit 416, and (b) respond to a set priority bit 416 by substantially elevating the entry for early selection for dispatch.

With specific reference to FIG. 4, there is illustrated a store queue mechanism 440 with store queue 407 that includes the standard registers for storing information, namely address register 411, data register 413, control bits 415, valid bit 417, and byte enable register 409. As shown, byte enable register 409 contains a number of bits, each corresponding to a smallest size of store granule within data register 413.

In addition to those components described above, one embodiment of the invention also extends the bookkeeping logic of each store queue entry to include priority bit 416. Priority bit 416 is set whenever the entry contains a STCX operation, and priority bit 416 is utilized to signal that the entry should be given elevated priority over the other eligible entries.

In a first implementation, priority bit 416 is an additional bit that is added to the store queue 407. However, in an alternate embodiment, priority bit 416 is a pre-selected one of control bits 415 that is re-assigned and programmed to provide the functionality of priority bit 416. In a third embodiment (not shown), a separate register is provided that is associated with (or a component of) the STQ controller 405.

Arbitration logic 406 utilizes priority bit 416 (or a reprogrammed one of control bits 415, etc.) to determine if an entry within store queue 407 has a STCX for processing. When an entry is valid (as indicated by valid bit 417), meets architectural rules to be valid for dispatch, and contains a STCX (as indicated by priority bit 416), STQ controller 405 preferentially selects the given entry for dispatch over all other valid, architecturally ready, non STCX entries within store queue 407 for dispatch. STQ controller 405 issues request signal 418 to RC dispatch logic 419 with select entry signal 422 indicating the entry within store queue 407 to be dispatched.

Figure 5A:
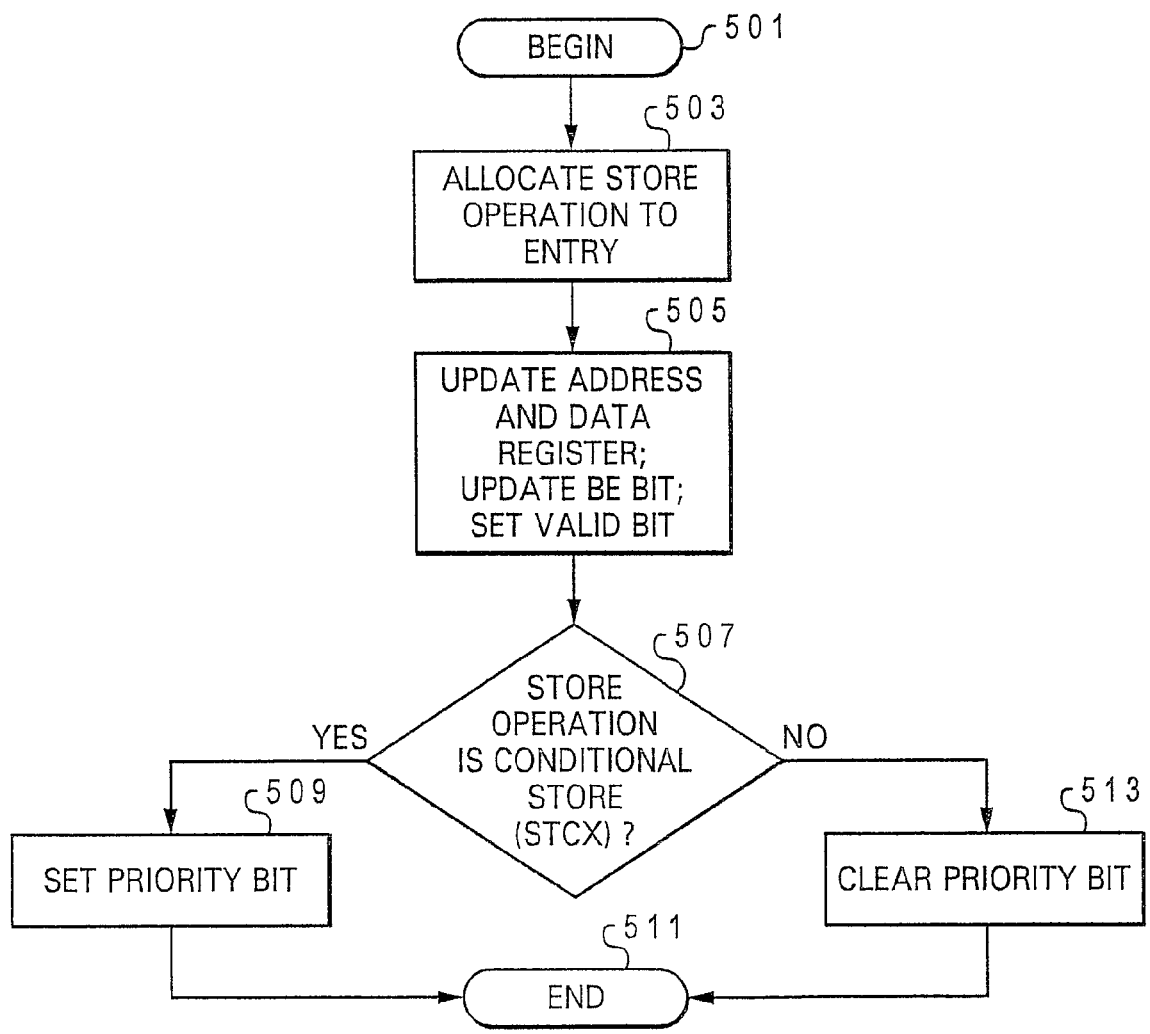
FIG. 5A is a flow chart illustrating the process of tracking when a STCX is placed within a store queue entry via a priority bit according to one implementation of the present invention.

With reference now to FIG. 5A, there is illustrated a flow chart of the process of allocating a STCX or normal store operation to an entry of the store queue configured with a priority bit. The process begins at step 501 and proceeds to step 503 at which a processor-issued store operation is allocated to an entry of the store queue. Contemporaneously with the updates to the address register 411, data register 413, and byte enable bit 409, the valid bit 417 is set, as indicated at step 505. A check is made at step 507 whether the store operation is a STCX. If the store operation is a STCX, priority bit 416 is also set for that entry at step 509, and the process ends at step 511. If, however, the store operation is not a STCX, processing continues at step 513 where the priority bit is cleared. The process ends at step 511.

Figure 5B:
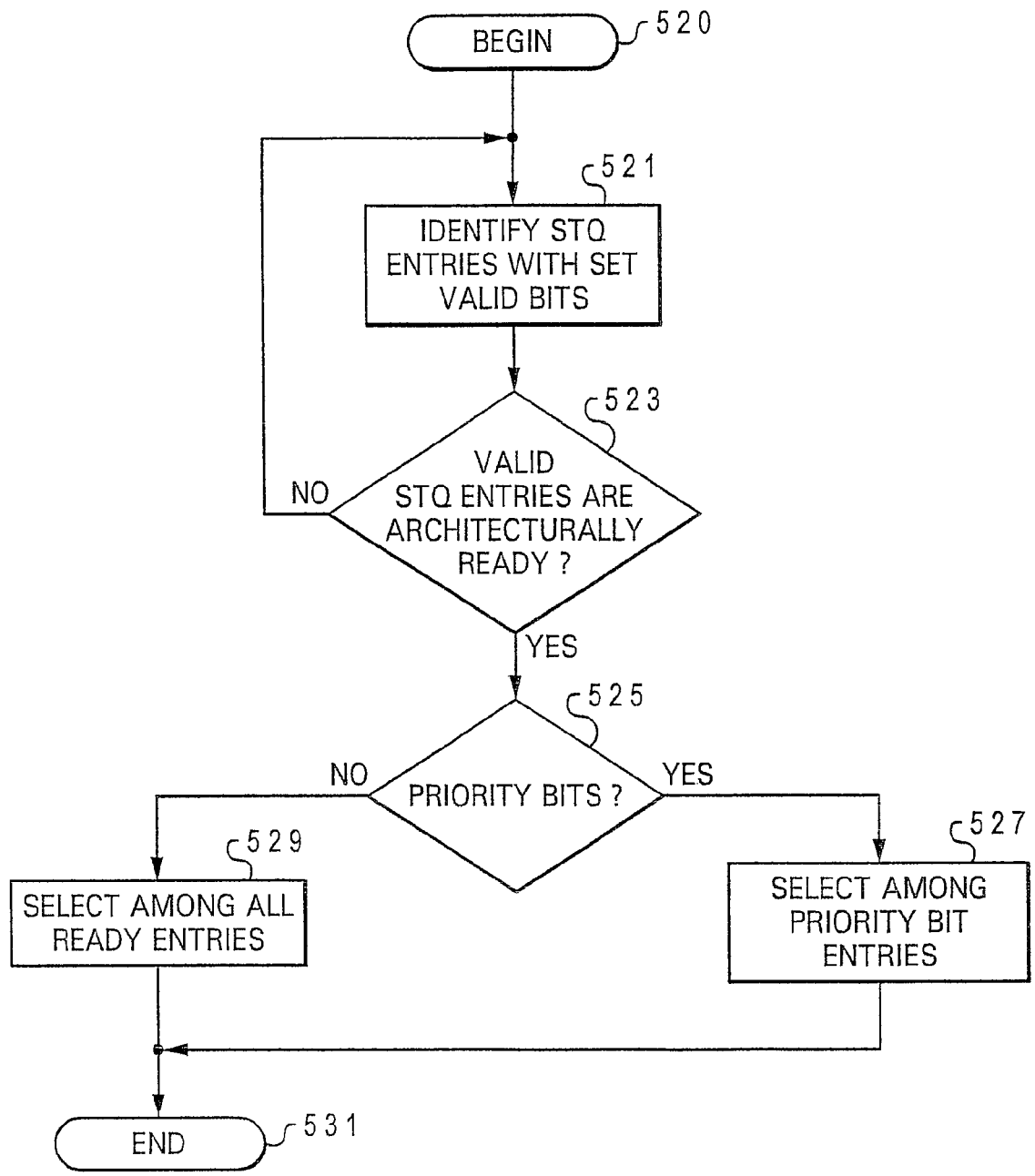
FIG. 5B is a flow chart of the process of arbitrating for selection of an entry with priority bits indicating which entry has a STCX operation in accordance with one embodiment of the present invention.

FIG. 5B illustrates the process by which arbitration logic 406 selects a single entry within store queue 407 to be dispatch. The process begins at step 520 and proceeds to step 521 at which the arbitration logic 406 identifies the valid entries (i.e., entries with valid bit 417 set). Once the valid entries are identified, the process moves to step 523 where arbitration logic 406 determines which, if any, of the valid entries can be dispatched within the established architectural rules. If no entry is ready for dispatch, the process returns to step 521 where the valid entries are identified. If valid entries that can be dispatched within the architectural rules are available, the process moves to step 525 at which arbitration logic 406 determines if priority bit 416 is set for any of the valid entries that are ready for dispatch. If one or more entry has its priority bite set, the process moves to step 527 where arbitration logic 406 selects from among the ready entry (or entries) with priority bit 416 set. The process then terminates at step 531. Returning to step 525, if no ready entry has a its priority bit 416 set, the process moves to step 529 at which arbitration logic 406 chooses from among all ready entries. The process then terminates at step 531. The process of FIG. 5B is repeated each time arbitration logic 406 selects or attempts to select an entry for dispatch to the RC machines.

Additional rules may be provided to control how the entry tagged with priority is elevated with respect to the other existing entries. These rules enable the entry to be dispatched by the arbitration logic as quickly as possible. In standard operation where most entries contain regular store operations, the entry with the STCX is elevated for selection as the first entry to dispatch when no dependency exists.

While the invention has been particularly shown and described with reference to a preferred embodiment, it will be understood by those skilled in the art that various changes in form and detail may be made therein without departing from the spirit and scope of the invention. For example, although the invention is described with a special priority bit within the store queue, the invention contemplates a configuration that includes a separate register or other type of logic for tracking which entries contain a STCX operation. These alternate implementations all fall within the scope of the invention.

What is claimed is:

1. A data processing system comprising:
   a memory hierarchy that provides coherent memory operation at a cache line level; and
   a processor chip coupled to the memory hierarchy via a system interconnect, said processor chip having a processor core, store queue (STQ) mechanism including a store queue, Read claim (RC) mechanism, and associated processor cache;
   logic within the STQ mechanism and RC mechanism for reducing latency of processing store conditional (STCX) operations, said logic including logic which:
      responsive to allocation of a STCX operation to an entry of the store queue, tags the entry as a higher priority entry relative to a prior entry allocated a regular store operation; and
      selects the higher priority entry for dispatch ahead of said prior entry during dispatch selection process, wherein the STCX operation is forwarded to said processor cache ahead of the regular store operation thus reducing store queue latency for forwarding STCX operations to said processor cache;
   wherein said RC mechanism further comprises logic for:
      first determining that both said higher priority entry and said prior entry are valid for dispatch;
      evaluating when a dispatch of the higher priority entry ahead of the prior entry does not violate a predefined architectural rule for dispatching entries from the store queue; and
      dispatching said higher priority entry ahead of said prior entry when a selection of said higher priority entry for dispatch ahead of said prior entry does not violate the predefined architectural rule for dispatching entries from the store queue.

2. The data processing system of claim 1, wherein said STQ mechanism includes logic for setting a priority bit associated with the higher priority entry, wherein a priority bit associated with the prior entry is not set.

3. The data processing system of claim 1, further comprising logic for:
   receiving said prior store operation within the prior entry of the store queue ahead of a receipt of the STCX in the higher priority entry; and
   ignoring an order of receipt of the operation in the prior entry and the STCX operation in the higher priority entry relative to each other when selecting an order for dispatch, wherein said ignoring includes determining when architectural constraints does not prevent selection of the higher priority entry ahead of the prior entry.

4. The data processing system of claim 1, wherein said RC mechanism comprises logic for dispatching said prior entry ahead of said higher priority entry when said determining step indicates that said architectural constraints prevents selection of the higher priority entry ahead of the prior entry.

5. The data processing system of claim 2, further comprising logic for:
   reading a value of the priority bit after verifying that an entry is valid for dispatch; and
   re-setting a priority bit associated with said higher priority entry when the STCX operation within the higher priority entry is dispatched.

* * * * *